April 17, 1956     C. W. HANSEN     2,742,329

DEFLECTOR FOR DELIVERY PIPE

Original Filed June 29, 1946     3 Sheets-Sheet 1

INVENTOR.
Charles W. Hansen
BY
Soans, Blaister & Anderson
Attys.

April 17, 1956  C. W. HANSEN  2,742,329
DEFLECTOR FOR DELIVERY PIPE
Original Filed June 29, 1946  3 Sheets-Sheet 2

INVENTOR.
Charles W. Hansen
BY
Soans, Glaister & Anderson
Attys.

April 17, 1956 C. W. HANSEN 2,742,329
DEFLECTOR FOR DELIVERY PIPE
Original Filed June 29, 1946 3 Sheets-Sheet 3

INVENTOR.
Charles W. Hansen
BY
Soans, Blaister & Anderson
Attys.

United States Patent Office 2,742,329
Patented Apr. 17, 1956

2,742,329

DEFLECTOR FOR DELIVERY PIPE

Charles W. Hansen, Racine, Wis., assignor to J. I. Case Company, Racine, Wis., a corporation of Wisconsin Original application June 29, 1946, Serial No. 680,447, now Patent No. 2,661,585, dated December 8, 1953. Divided and this application April 13, 1953, Serial No. 348,209

6 Claims. (Cl. 302—61)

The present invention relates generally to delivery pipes of the type used in the forced-air delivery of finely divided solid materials, such as grain, and is more particularly concerned with a deflector for the discharge end of the delivery pipe.

In the use of delivery pipes in connection with blower mechanism and the like for conveying material such as grain, silage and chaff from a machine into a receptacle, it is particularly desirable that means be provided at the discharge end of the delivery pipe for selectively deflecting the discharged material in any desired direction. The adjustable deflector feature is important in being able to provide for even distribution of the discharged material throughout the receptacle, whether the latter be a wagon or truck accompanying a harvesting machine, or a stationary bin or silo to which material is being elevated.

The principal object of the present invention is to provide a novel and improved form of deflector for a delivery pipe affording universal movement of the deflector, that is both vertically and horizontally, with respect to the discharge end of the delivery pipe. Another object of this invention is to provide a delivery pipe deflector of the type described, which is adjustable to alter the direction of the path of the discharged material from a position remote from the deflector. The above and other objects and advantages will be made apparent in the accompanying drawings and the following description of a preferred embodiment of the invention.

In the drawings:

Fig. 3 is an enlarged, side elevational view of the delivery pipe hinge connection;

Fig. 4 is a plan view of the structure in Fig. 3;

Figure 1:
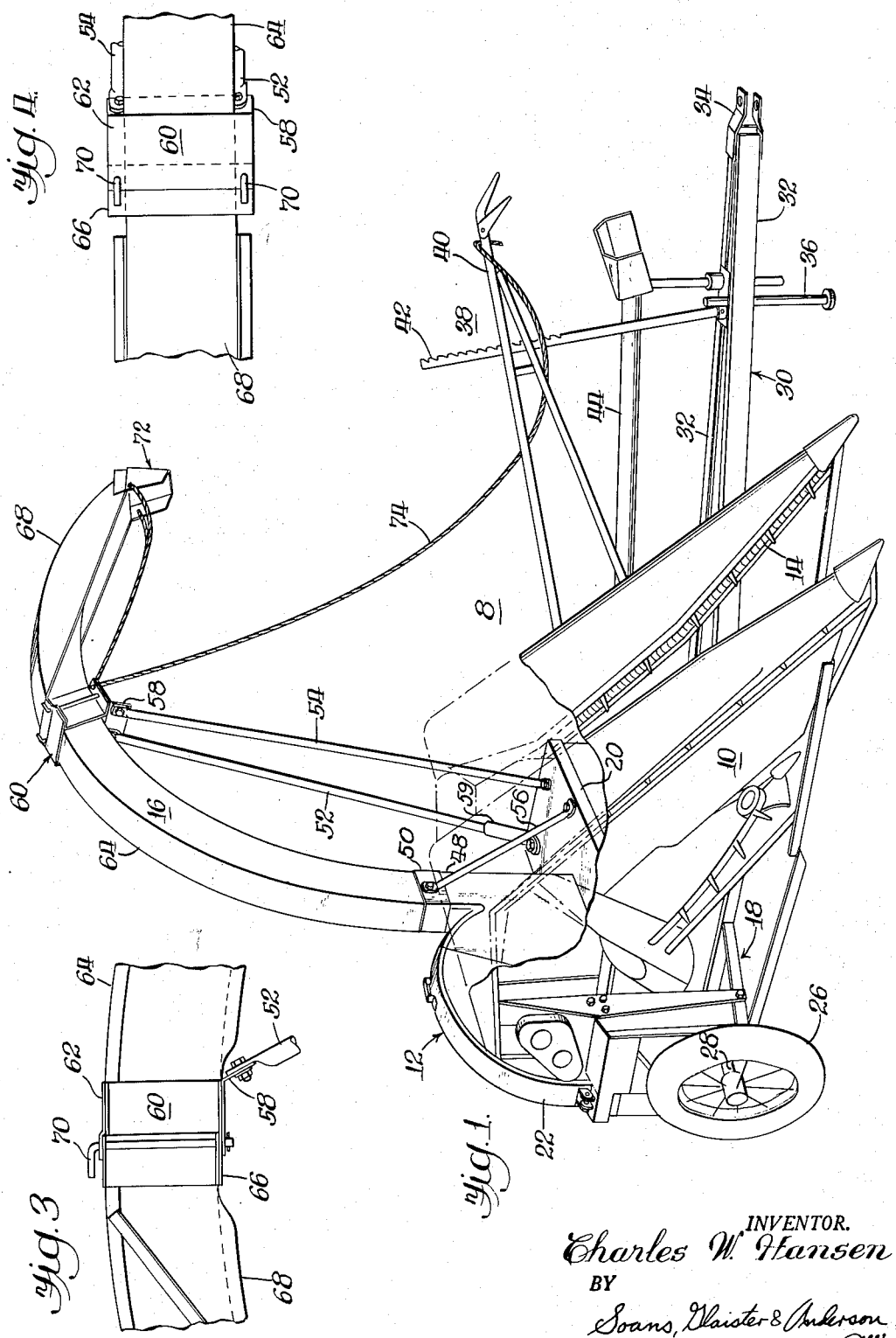
Fig. 1 is a perspective view of a row-crop forage harvester embodying the present invention, with portions broken away in the interest of clarity.

Referring particularly to Fig. 1, it will be seen that in order to illustrate the present invention there is shown a forage crop harvester 8, of the type used in the harvesting of row-crops, which comprises a crop collecting and feeding unit 10 and a crop cutting and delivery unit 12. The harvester is operable to sever row fodder crops, such as corn and sorghum, and deliver them to the cutting and delivery unit 12, through means including the chain rake conveyor 14. The cutting and delivery unit 12 cuts the harvested crop into fairly small pieces suitable for feed and discharges the cut particles through a delivery pipe 16 to a vehicle (not shown) for transporting to a silo, silage trench or other disposition point.

The particular forage crop harvester illustrated in the drawings is more fully described in my copending application Serial No. 680,447, filed June 29, 1946, now U. S. Patent 2,661,585 dated December 8, 1953, the present application being a division of such previously filed application.

The crop cutting and delivery unit 12 supports the complete harvester and includes a main frame 18 which is fabricated of suitable plate, angle and channel structural members which define a generally horizontal platform portion 20 and a housing 22 for the rotatable cutter and blower wheel means (not shown). At one side of the blower housing there is provided an outlet conduit 24 for the cut crop material, and the delivery pipe 16 extends from the outlet 24.

Suitable support wheels 26 are journalled on an axle 28, which is fixed to the frame 18, in order that the harvester may be moved during use. A fabricated yoke-shaped drawbar 30, which includes a pair of channel side sections 32, is suitably connected to the axle 28 for hinged movement relative thereto. The forward end of the drawbar 30 is provided with a clevis 34 for connection to a tractor drawbar (not shown) by means of a suitable hitch pin. An adjustable stand 36 is provided in order that the drawbar may be supported at the proper elevation while the tractor is being hitched to the drawbar. The stand 36 is, of course, raised during travelling movement of the harvester.

In order to provide for adjustment of the crop collecting unit 10 relative to the ground, there is also provided an adjustable connecting means 38 between the drawbar and the frame. This connecting means includes a forwardly extending adjusting lever 40 rigidly affixed to the blower and cutter frame 18, a notched link 42 and a spring latch connection (not shown) providing for detachable engagement of the lever 40 with a selected one of the notches at the upper end of the link 42. It will be apparent that vertical movement of the adjusting lever 40, relative to the drawbar 30, will rotate the attached crop collecting unit 10 and crop cutting unit 12 about the axle 28, thereby altering the position of the forward end of the collecting means 10 relative to the ground level.

The forage harvester 8 also includes a suitable enclosed power take-off shaft 44, extending forwardly from the main portion of the harvester in supported overlying relation to the drawbar 30 to a position adjacent the clevis 34 for connection with the power take-off on the tractor. The shaft 44 provides for the transmission of power to a suitable drive mechanism on the harvester, a portion of which is indicated at 46 in Fig. 2, for operating the crop cutting and delivery unit 12.

This arrangement and structure of the delivery pipe 16 for the crop cutting and delivery unit 12 makes possible the delivery of the cut crop to either the rear or the side of the harvester, as may be required. More specifically, the outlet conduit 24 for the blower housing 22 is preferably made square at its outer end 48, in order that it may receive the square inner end section 50 of the delivery pipe, so as to selectively position the delivery pipe 16 to the side, as shown in Fig. 1, or to rear as shown in Fig. 2.

There is preferably provided three bracing members 52, 54 and 56 which are adapted to properly support the delivery pipe 16 in either selected position. The two braces 52 and 54 are relatively rigid, elongated members which are bolted at one end to the platform 20 of the frame 18 and extend upwardly therefrom to a bolted connection at the other end with a bracket plate 58 (Fig. 2) which is provided at the central portion of the delivery pipe. The third brace 56 is a short tie member which extends from the lower end 50 of the delivery pipe 16 to the front of the frame platform 20 (Fig. 1), primarily to hold the lower end of the delivery pipe in tight engagement with the cooperating outer end section 48 of the blower outlet 24.

Figure 2:
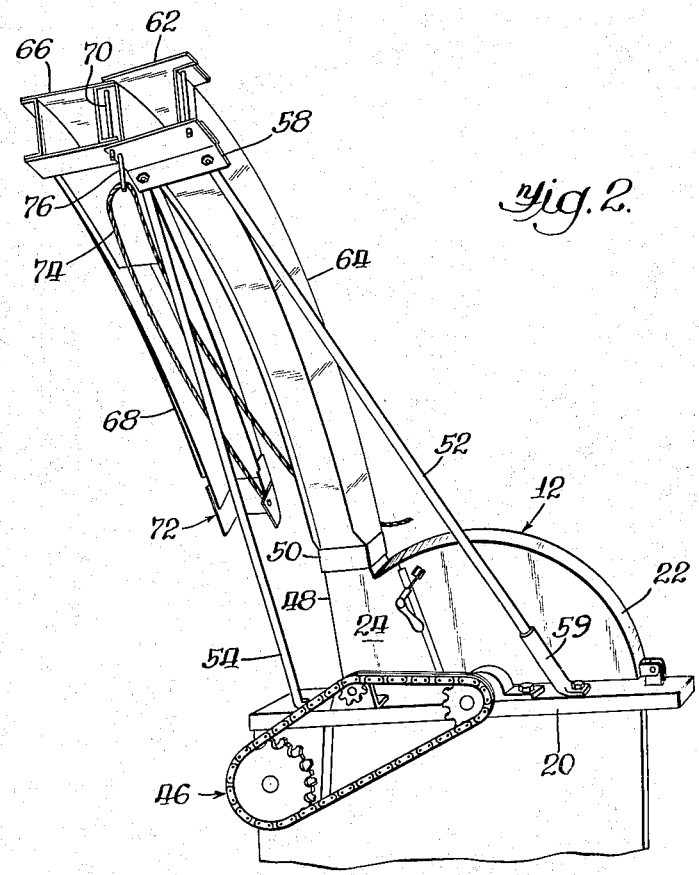
Fig. 2 is a perspective view of a portion of the harvester in Fig. 1, with the delivery pipe folded back into transport position.

When it is desired to move the delivery pipe 16 from the side discharge position, shown in Fig. 1 to the rear discharge position shown in Fig. 2, the bolts attaching the two main braces 52 and 54 are released, the upper end of the smaller brace 56 is disengaged from the lower end 50 of the delivery pipe, and the entire delivery pipe 16 is lifted off the outlet end 48 of the blower housing and rotated 90°. The two main braces 52 and 54 are very useful at this time in holding the delivery pipe in proper position. After the rotation of the pipe 16 has been completed and the cooperating square portions 48 and 50 reengaged, the two main braces 52 and 54 are reattached to the platform 20, as shown in Fig. 2. It will be noted that the brace 54, which was previously located in front of the blower housing 22, is now moved around to substantially the same position that was previously occupied by the other long brace 52, and that the brace 52 is now attached to the platform 20 in rear of the blower housing 22 adjacent the opposite side of the latter. An adjustable section 59 is provided at the lower end of the brace 52, in order that its length may be adjusted the required amount during this operation of relocating the delivery pipe 16.

As indicated previously, the delivery pipe 16 is constructed to provide for folding the pipe on itself, so as to prevent it from projecting materially beyond the support wheels 26 for the harvester. This feature of construction is very advantageous in the movement of the harvester on the highway and through fence gates and the like. In the illustrated embodiment the delivery pipe is divided intermediate its ends, at approximately the midpoint thereof, by the hinge connection 60.

The hinge connection 60 comprises a box-like structure 62 which is affixed to the inner pipe section 64, as shown particularly in Figs. 3 and 4, a cooperating box-like structure 66 attached to the outer delivery pipe section 68, and a pair of hinge pins 70 which extend through aligned openings (not shown) in the inter-fitting box-like structure 62 and 64. It will be noted that removal of either of the hinge pins 70 permits the outer section 68 of the delivery pipe 16 to be swung around the other pin 70 out of endwise engagement with the inner section and into a position alongside of the latter, as seen in Fig. 2. Furthermore, the outer section 68 may be swung in either direction in order that it will clear the brace members 52 and 54, regardless of the position of the delivery pipe 16. This arrangement is decidedly advantageous over folding pipes which are moved in a generally vertical plane. The illustrated delivery pipe is the subject of a copending divisional application Serial No. 348,928, filed April 13, 1953.

As indicated generally at 72, there is also provided a hinged deflector means for the outer end of the delivery pipe 16, which is controlled through a rope 74 extending from the deflector through suitable guide means 76 (Fig. 2) to a position adjacent the handle for the spring latch connection at the forward end of the height adjusting lever 40 (Fig. 1). This is particularly advantageous in that it provides a convenient means for altering the direction of the material being delivered and thus assures even filling of the storage receptacle. For example, in the use of the illustrated forage crop harvester there will normally be a wagon or similar vehicle accompanying the harvester to receive the cut crop material being discharged through the delivery pipe 16. Through the use of the deflector 72 it is possible to change the direction of delivery from the outlet end of the pipe and thus spread the material evenly along the length of the wagon.

Figure 5:
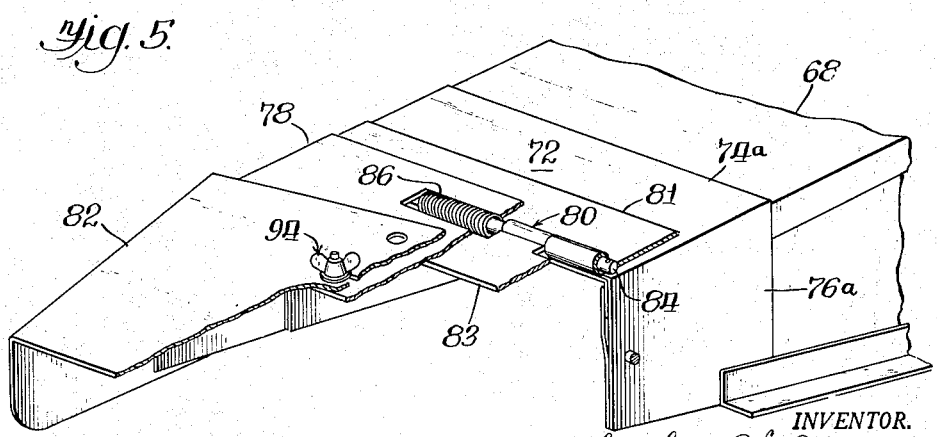
Fig. 5 is an enlarged perspective view, with parts broken away, of the delivery pipe deflector.
Figure 6:
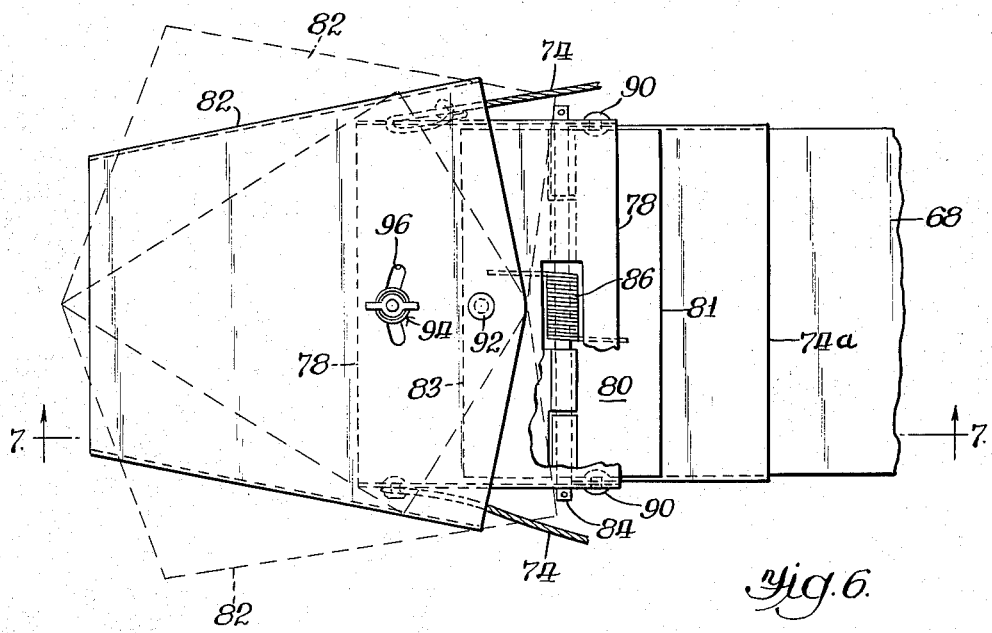
Fig. 6 is an enlarged plan view of the adjustable delivery pipe deflector.
Figure 7:
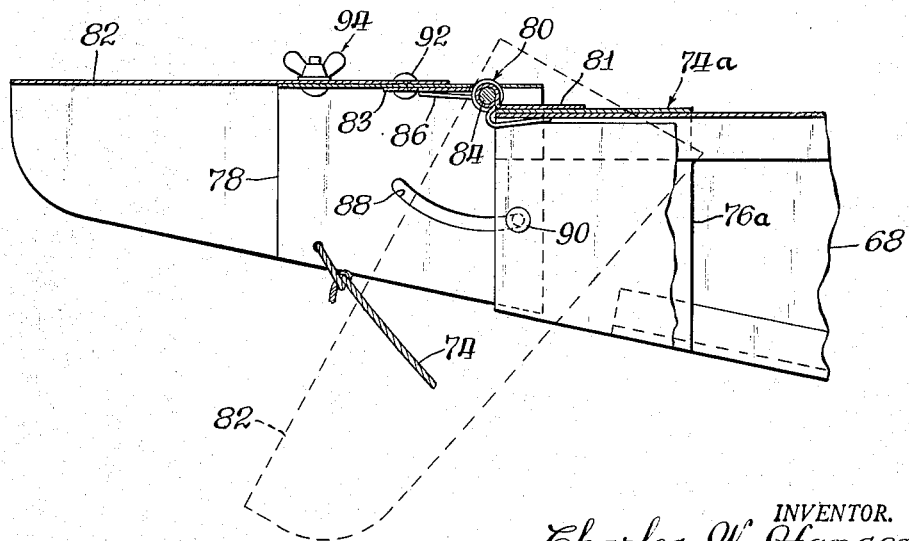
Fig. 7 is a side elevational view of the structure in Fig. 6, with parts broken away.

More specifically, the outer section of the delivery pipe 16 is open at its bottom and the guide means or deflector 72 is fixedly supported on the end of the pipe in extending relation thereto. As seen particularly in Figs. 5–7, the guide means 72 includes a stationary channel-shaped member 74a having downwardly depending sides 76a fixed on the end of the outer section 68 of the delivery pipe 16, a second channel-shaped member 78 which is hingedly supported on the stationary channel member 74a by a spring-biased hinge 80, and a deflector member 82, also channel-shaped, which is adjustably supported on the hinged member 78. The hinge 80 comprises a pair of hinge plates 81 and 83, a hinge pin 84 inserted through the aligned openings provided by the interfitting loops along the inner edges of the hinge plates, and a coil spring 86 which surrounds the hinge pin 84 and has opposite ends underlying the hinge plates 81 and 83, respectively.

The channel-shaped member 78 is provided on opposite sides with an arcuate slot 88 (Fig. 7) which engages a pin 90 affixed to each of the depending sides 76a of the channel-shaped member 74a for defining the limits of movement of the deflector about the spring hinge 80. The spring hinge biases the member 78 and 82 to the position shown in full in Fig. 7, and the broken-line outline in this figure indicates the limit of downward movement.

The deflector 82 is fastened to the hinged member 78 and the hinge plate 83 by a pin or rivet 92 and a wing nut connection 94 which engages an arcuate slot 96 provided in the deflector 82. This arrangement permits the deflector 82 to be swung about the axis of the pin 92 at right angles to the hinge support for the deflector, and the deflector support 78. The two extreme lateral positions of the deflector are shown in broken-lines in Fig. 6. Thus, the deflector may be set to cause delivery of the cut crop at an angle to the axis of the delivery pipe 16.

The lower end of the deflector support member 78 has the rope 74 attached thereto which extends back through a suitable guide and support means 76 (Fig. 2) to a position adjacent the handle for the spring latch connection at the forward end of the height adjusting lever 40. This arrangement permits convenient control of the deflector 82 during the operation of the harvester to alter the direction of delivery of the cut crop between fairly wide limits by lowering and raising the position of the deflector. The angular position of the deflector about the pin 92 is adjusted prior to the harvesting operation in the ilustrated embodiment but, if conditions require frequent changing of this angular position, means similar to those for adjusting the deflector vertically might be used.

There is provided, therefore, a deflector means for the discharge end of a delivery pipe which is adjustable both vertically and horizontally to alter the direction of flow of material being discharged, to thereby provide for a more even distribution of the material over the area of the receptacle being filled. Furthermore, it is seen that adjustment of the deflector might readily be accomplished from a position remote therefrom, such as the operator's station on a mobile forage crop harvester.

Although described with respect to a delivery pipe for a forage crop harvester, it will be readily apparent that the principles of the present invention are equally applicable to many other types of material handling devices. Furthrmore, various modifications of the particular deflector disclosed herein might well be made without departing from the underlying principles of this invention.

I claim:

1. A hinged deflector for selectively controlling the direction of discharge of material from a delivery pipe, said deflector including a hinge which is fixedly connected at one side to said delivery pipe, a deflector support member which is fixedly supported upon the other side of said hinge, the axis of said hinge extending transversely to the axis of said delivery pipe, and a deflector member which is supported upon said support member by means which permits movement of said deflector member relative to said support member about an axis which extends generally at right angles to the axis of said hinge.

2. A hinged deflector for controlling the direction of discharge of material from a delivery pipe, said deflector including a support member disposed in extending relation to the discharge end of the delivery pipe, a spring biased hinge means connecting said support member to said delivery pipe for relative movement about an axis extending transversely to the axis of said delivery pipe, and a deflector member which is supported upon said support member by means affording relative movement therebetween about an axis which extends generally at right angles to the axis of said hinge means.

3. An articulated structure for use with a delivery pipe to control the direction of material being delivered thereby comprising, a support member including a spring biased hinge means fixed thereto in position for attachment with the discharge end of a delivery pipe to provide for relative movement of the support member about an axis generally normal to the axis of the delivery pipe, a deflector member carried by said support member in extending relation thereto by means affording relative movement between said support member and deflector member about an axis which extends generally at right angles to the axis of said hinge means, and control means for moving said support member in opposition to said spring for said hinge means.

4. A hinged deflector for use with a delivery pipe to control the direction of material being delivered thereby comprising, a support frame including a first channel-shaped member adapted for telescopic connection with the discharge end of the delivery pipe, a second channel-shaped member disposed similarly to said first channel-shaped member in extending relation thereto, a spring biased hinge means connecting the adjoining web portions of said channel-shaped members for relative movement about an axis generally transverse to the direction of extension of said channel-shaped members, a deflector member carried by said second channel-shaped member in longitudinally extending relation thereto by means affording relative movement between said second channel-shaped member and deflector member about an axis which extends at right angles to the axis of said hinge means and in a plane parallel thereto, and means for selectively securing said second channel member in position relative to said first channel member.

5. In combination with a delivery pipe for a harvester, a hinged deflector for controlling the direction in which material is discharged from said pipe, said deflector including a first channel-shaped member telescopically connected with the discharge end of said pipe, a second channel-shaped member hingedly connected to said first member in extending relation thereto, biasing means interconnected between said first and second channel-shaped members urging said second channel-shaped member into a generally coaxially aligned relation with said first channel-shaped member, and a deflector member which is mounted on said second channel-shaped member in longitudinally extending relation thereto by pivot means affording relative movement between said deflector member and said second channel-shaped member about an axis which extends generally at right angles to the axis of said hinged connection between said channel-shaped members in a plane generally parallel to said hinge axis.

6. A deflector of the class described for use with a field forage harvester which includes a curved delivery pipe for directing cut crop material into a wagon or the like, said deflector including a hinge which is fixedly connected at one side to the discharge end of said delivery pipe, a channel-shaped deflector support member which is attached to the other side of said hinge, the axis of said hinge extending generally horizontally, and a channel-shaped deflector member which is supported upon said channel-shaped support member by means which permits adjustment of said deflector member relative to said support member about a generally vertical axis, resilient means biasing said deflector support member in one direction, and control means for said deflector connected to the forward end of the forage harvester, said control means being operable to overcome the biasing action of said resilient means and thereby change the position of said deflector relative to said delivery pipe.

References Cited in the file of this patent

UNITED STATES PATENTS

| 968,713 | Stoner | Aug. 30, 1910 |
| 1,765,115 | Wells | June 17, 1930 |
| 2,477,795 | Gehl | Aug. 2, 1949 |
| 2,496,472 | Huddle | Feb. 7, 1950 |